(12) United States Patent
Fok

(10) Patent No.: US 6,374,084 B1
(45) Date of Patent: Apr. 16, 2002

(54) METHOD AND SYSTEM FOR CALIBRATING ELECTRONIC DEVICES USING POLYNOMIAL FIT CALIBRATION SCHEME

(75) Inventor: Wilson Fok, Monmouth, NJ (US)

(73) Assignee: Avaya Technology Corp., Basking Ridge, NJ (US)

( * ) Notice: Subject to any disclaimer, the term of this patent is extended or adjusted under 35 U.S.C. 154(b) by 0 days.

(21) Appl. No.: 09/243,338

(22) Filed: Feb. 1, 1999

(51) Int. Cl.$^7$ ............................................... H04B 17/00
(52) U.S. Cl. .................. 455/67.4; 455/226.1; 455/423; 324/601
(58) Field of Search ............................... 455/67.1, 67.4, 455/423, 424, 425, 226.1; 324/601

(56) References Cited

U.S. PATENT DOCUMENTS 5,881,376 A * 3/1999 Lundberg ................ 455/226.1

* cited by examiner

*Primary Examiner*—Vivian Chang
*Assistant Examiner*—James Moore
(74) *Attorney, Agent, or Firm*—Darby & Darby

(57) ABSTRACT

A system and method calibrates the magnitude of a parameter used to adjust an output characteristic of an electronic device in accordance with the magnitude of an input signal. The system generates a plurality of test data points. Each data point includes a test input signal magnitude and the corresponding parameter value which, when applied by the device, produces the correct output level for an input having the test magnitude. The data points are generated by a calibration control system which sets the test signal magnitude and then adjusts the parameter value until the correct output level is detected. The test data points are analyzed to determine the value for coefficients of an equation of predetermined form that defines a curve that substantially follows a plot of said plurality of test data points. The coefficients are stored in the electronic device. When the electronic device evaluates the equation using the stored coefficients and the detected magnitude of an actual input signal, the result is the appropriate parameter value for producing a calibrated output.

9 Claims, 5 Drawing Sheets

METHOD AND SYSTEM FOR CALIBRATING ELECTRONIC DEVICES USING POLYNOMIAL FIT CALIBRATION SCHEME

TECHNICAL FIELD

This invention is related to a method and system for calibrating electronic devices and, more particularly, for generating device calibration information using polynomial curve fitting.

BACKGROUND OF THE INVENTION

Many types of consumer electronic devices include a microprocessor or other control mechanism for adjusting the operation of various circuit elements in response to input conditions, such as the gain of an output amplifier in response to the strength of a received signal. Because of variations in the actual operating characteristics of various circuit elements introduced by variations in fabrication, the response of these devices to particular inputs must be calibrated in order to assure that separately manufactured devices operate in the same manner.

For example, CDMA cellular telephone system design requirements specify that the signal strength of a transmission from a mobile cellular device as received at a base station have a particular signal strength. Because the received power is dependent on the distance between the base station and a given mobile unit, which distance may change during operation, power adjustments must be made continuously. Further, the power adjustments must be relatively quick and precise. Under the IS-98 cellular standard, for example, mobile units must be able to adjust their output power level over a 24 dB range with a tolerance of +/–0. 5 dB within 800 bps.

The distance from the base station can be estimated given the strength of a signal received from the base station and the known power at which the base station is transmitting. However, because feedback about the received signal strength is not generally provided to the mobile units from the base station, each mobile unit must be pre-programmed with the proper transmitter amplifier gain settings across the expected range of input signal strengths. While general response characteristics of the amplifier, such as the absolute gain in response to a control signal of a specific value, can be predicted, the actual response varies from unit to unit because of variances introduced during manufacture. Accordingly, the specific transmit gain settings which must be used by each unit in response to a given received signal strength must be determined during a calibration process and then stored in an internal memory.

In a conventional calibration process, test signals are input to the device and a corresponding response parameter is adjusted until the proper output is achieved. For example, a simulated signal from a base station may be input to a base unit and the transmitter gain adjusted until the proper transmit signal power level is reached. The gain setting is then captured. The process is repeated for a number of other input signal strengths and the results are stored as a look-up table in an EEPROM within the device.

In devices such as cellular telephones, a large number of parameters must be calibrated in this manner. In addition, the same parameter may need to be calibrated under different operating conditions. For example, the gain control settings may need to be calibrated for each combination of possible transmit and receive channels. Accordingly, the total number of calibration data points which must be stored is typically very large and so the number of data points which are stored for a particular parameter under a given set of conditions is relatively limited, generally in the range of 8–16 points.

In operation, conventional devices use the look-up table to determine the proper parameter settings, such as the magnitude of a transmit gain control signal, in response to particular inputs. Because only a limited number of defined calibration points are stored in the look-up table, linear interpolation is generally used to determine a parameter setting. FIG. 1 is a typical graph of a 15 point calibration data look-up table which provides the proper control voltage, Rx_AGC, for an output gain control circuit for a specific received signal strength, RssiA, for a cellular telephone.

In a conventional interpolation system, when the input signal strength does not fall exactly on one of the calibration data points, the two closest points in the lookup table are identified and used to construct a straight line which includes the two points. The dependent value of the control voltage is then determined based on where along the line the input falls. For example, using this method, an input of RssiA =–74 dBm results in a control voltage Rx_AGC of 1.5 mV.

A major drawback to this technique is that the limited number of data points restricts the accuracy of the system. Increasing the number of calibration points is generally not an option due to the large number of parameters and operating conditions for which a device, such as a cellular telephone, must be calibrated. Accuracy is further limited in response regions where the transfer function is substantially non-linear. Although calibration points are generally concentrated in these non-linear areas to compensate for this, this accuracy of the response in the middle region suffers as a result. Similarly, the accuracy of the response outside of the calibration range suffers because the response is typically most non-linear at the ends of the operating range.

Another drawback to this technique is the delay associated with on-the-fly interpolation. Input conditions often change suddenly in response to changes in environmental conditions and a fast response is required. For example, input signal strength can experience a sudden "deep" fade in strength if the mobile unit moves behind an obstacle. The processing required to scan the look-up table to select the proper data points and then interpolate the points to determine the corresponding control voltage signal hampers the real-time performance.

SUMMARY OF THE INVENTION

These and other problems are solved with a method and system according to the present invention in which some or all of relevant device parameters are calibrated by pre-processing gathered calibration data points to generate a polynomial equation of a curve which represents a particular parameter's characteristic response. As many calibration points as are necessary to generate an accurate curve are used. After a curve with the required degree of accuracy has been generated, the particular coefficients for the curve are stored within the device. For may applications, a third-order polynomial provides a sufficient degree of accuracy and thus only four coefficients need to be stored in the device for each calibration sequence. When the calibrated device is subsequently operated, the proper value for a parameter in response to a given input condition is easily and quickly determined by retrieving the appropriate calibration coefficients and then evaluating the polynomial as a function of the input condition. This not only improves the calibration of the device but can provide for increased response speed because the calibration polynomial may require less calculation than conventional extrapolation techniques.

BRIEF DESCRIPTION OF THE DRAWINGS

The foregoing and other features of the present invention will be more readily apparent from the following detailed description and drawings of illustrative embodiments of the invention in which.

DETAILED DESCRIPTION OF THE PREFERRED EMBODIMENTS

Figure 2:
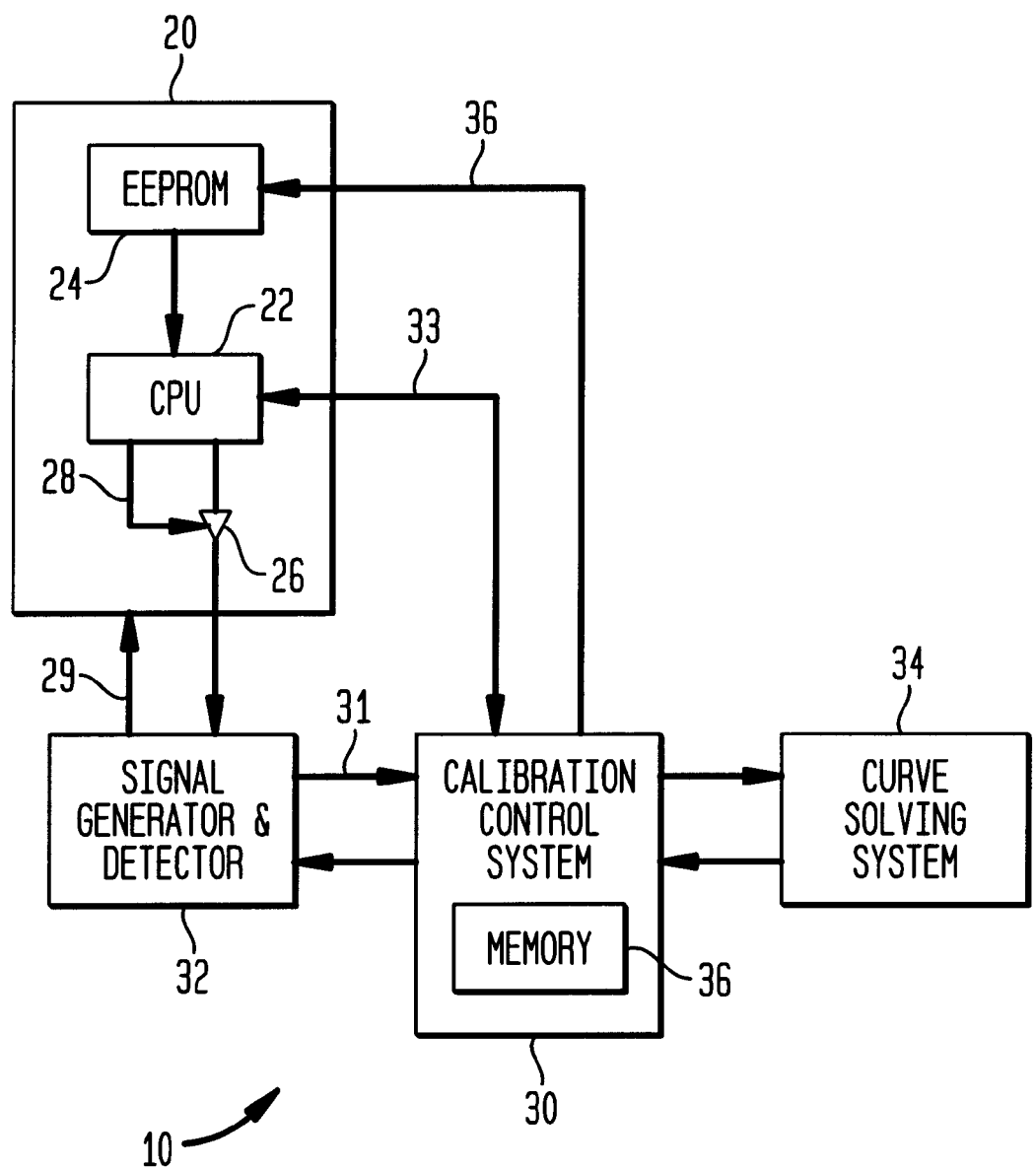
FIG. 2 is a block diagram of a calibration system according to the present invention.

Turning to FIG. 2, there is shown a block diagram of a calibration system 10 for calibrating an electronic device 20, such as a cellular telephone, according to the present invention. The device 20 to be calibrated includes a micro-controller 22 which is connected to a memory 24, such as an EEPROM. The controller 22 sets the value of device operating parameters in response to measured input conditions. For example, in the case of a cellular telephone, the power output of an output amplifier 26 is controlled by a control signal Rx_AGC 28. The magnitude of control signal 28 is selected in response to the detected strength of an input signal 29, such as the received signal strength RssiA. Because of variances in manufacturing conditions, the operation of similar devices in response to the same control signals will vary. Accordingly, each device is calibrated to compensate for this variation.

During a calibration process according to the invention, the device 20 is connected to a signal generator and detector 32 which generates a specific set of test signals and measures a response. For example, simulated input test signals of various power can be generated and the magnitude of the output signal from the amplifier 26 detected. The signal generator and detector 32 is controlled by a calibration control system 30. Control system 30 controls the properties of the input test signals 29 and also monitors the value of one or more output parameters of interest, i.e., via signal 31, as they are measured by the Generator/Detector 32. In addition, the control system 30 is connected to the device 20 via control input 33 which is used to adjust the magnitude of the parameter being calibrated, either directly or through an appropriate calibration program run by the micro-controller 22. The parameter being calibrated is adjusted until the measured response reaches the appropriate value. The calibrated magnitude of the parameter and the corresponding input test signal level are then stored as a calibration data point in the calibration system 30.

For example, a test signal simulating a broadcast signal from a base station may be set to a power level of −60 dBm and applied as an input to a cellular telephone being calibrated. According to design standards, a particular output power level is required in response to a −60 dBm input signal. The magnitude of the output power control signal 28, which sets the power level of the output amplifier 26, is adjusted until the measured power output from the device reaches the appropriate level. The magnitude of the control signal 28 which produced the correct output signal is then recorded along with the magnitude of the test signal. Preferably, the test signal magnitude as determined by the device itself is recorded, rather than the known input magnitude, to compensate for variations in the units internal power detection circuitry.

The process is repeated for different input signal values until a sufficiently large number of data points for the parameter in question are recorded. According to the invention, and contrary to the prior art, these data points are not stored in the device itself. Rather, they are stored in a memory 36 of the control system 30. Therefore, the number of data points which can be stored is not limited by the size of the memory 24 in the device 20 which is being calibrated. Using conventional testing equipment, data points can be determined at a rate that typically exceeds 1000 points per minute.

Once a sequence of data points is collected, it is passed to curve solving system 34 which analyzes the data points to determine the best curve to fit the supplied data within certain predetermined limitations. Preferably, curve solving system 34 generates the coefficients of a polynomial f(x) of predetermined degree n that fits the supplied data points as closely as possible, for example, in a least squares sense. Once a curve that fits the data points gathered by the calibration sequence is generated, the appropriate coefficients are returned to the control system. The control system then stores the coefficients in the memory 24 of the device 20 using the control input 33 or perhaps a specialized data input 35 feeding more directly into the memory 24.

According to the invention, the generated coefficients thus encapsulate the entire set of generated test points. To determine the proper parameter value setting for the calibrated device under a given input condition, all that is required is to retrieve the coefficients from memory 24 and evaluate the resulting equation using the input condition.

Preferably, the calibration control system 30, which operates the curve solving system 34, is comprised of a computer system running conventional curve fitting software, such as Microsoft EXCEL, available from the Microsoft Corporation of Redmond, Wash., U.S.A. The calibration control system passes the captured data points to the curve solving system, initiates the analysis, and accepts the results using conventional techniques which are known to those of skill in the art. In a particular embodiment, the calibration control system uses Visual Basic's ActiveX Control to access the curve fitting software and the process is encapsulated as a programming event which returns the appropriate coefficients when the analysis is complete. Although curve solving system 34 is discussed as a separate device, in an alternative embodiment, appropriate curve fitting software routines can be integrated into the calibration system itself.

According to a preferred embodiment of the invention, the general form of the equation for a given parameter is determined prior to calibration. Although individual units will have varying response characteristics, the shape of the response curve is generally the same. The proper equation form is preferably determined by fitting various equations to a representative set of data points and selecting the equation having the fewest coefficients and which matches the data points to the required accuracy. Advantageously, establishing the proper equation form for each parameter is a one-time event which is performed as part of the device design process. More advantageously, determination of the proper equation can be an automated process, provided that representative (or simulated) test data points are available to evaluate various forms.

Various tests for curve-fit accuracy may be used. Preferably, curve accuracy information of this type is returned by the curve solving system 34 to the calibration control system 30 during calibration. Using one measure of accuracy, $R^2$, the square of the residue, a curve can be considered to be accurate enough when $R^2$ is, for example, greater than 0.99, where a value of 1 represents a perfect fit. This value is provided as an output from the curve-fitting routines included with Microsoft EXCEL. Of course, other measures of curve fitting accuracy can also be used.

According to another aspect of the invention, when an unexpectedly low value of $R^2$ is detected during calibration, it is considered an indication that the device being calibrated is not operating correctly. This additional quality check information is not available in conventional calibration processes. In particular, under normal conditions, the curve defined by the calibration coefficients will match the gathered data points at or above the minimum established accuracy, such as $R^2>0.99$. When this accuracy cannot be achieved, it may be the result of a device flaw that may not otherwise be detected until a complete failure occurs. Thus, when the calibration error measurement is not acceptable, the particular device is preferably tagged for closer inspection.

Figure 1:
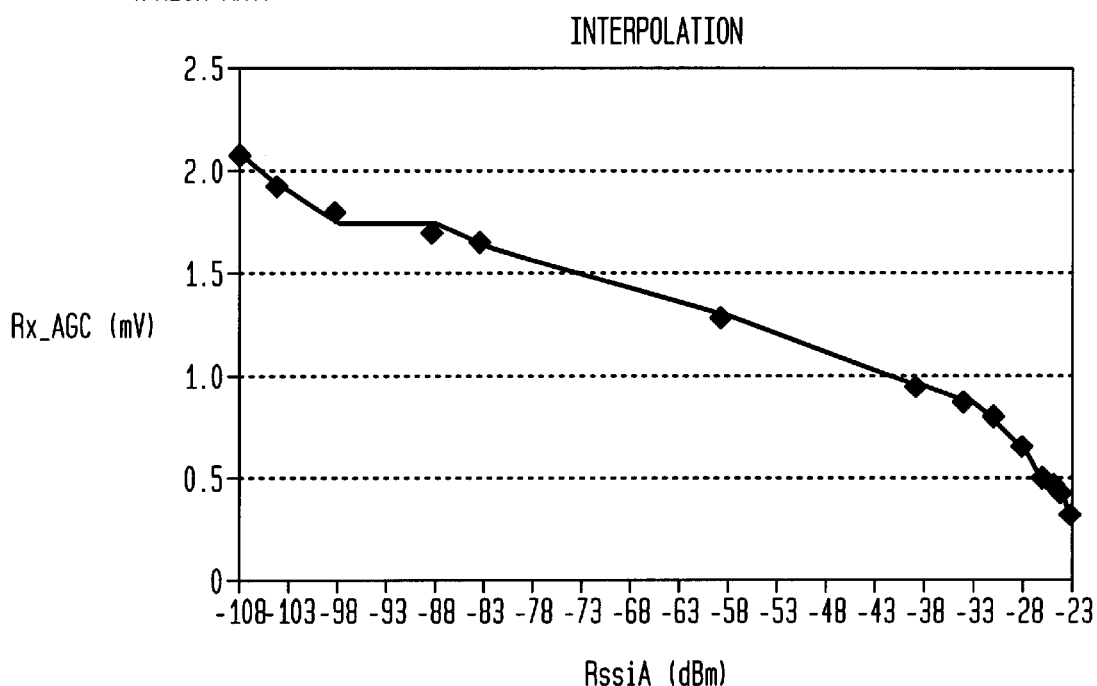
FIG. 1 is a graph of a calibration data point look-up table illustrating conventional interpolation techniques for selecting a parameter value according to input conditions.
Figure 3A:
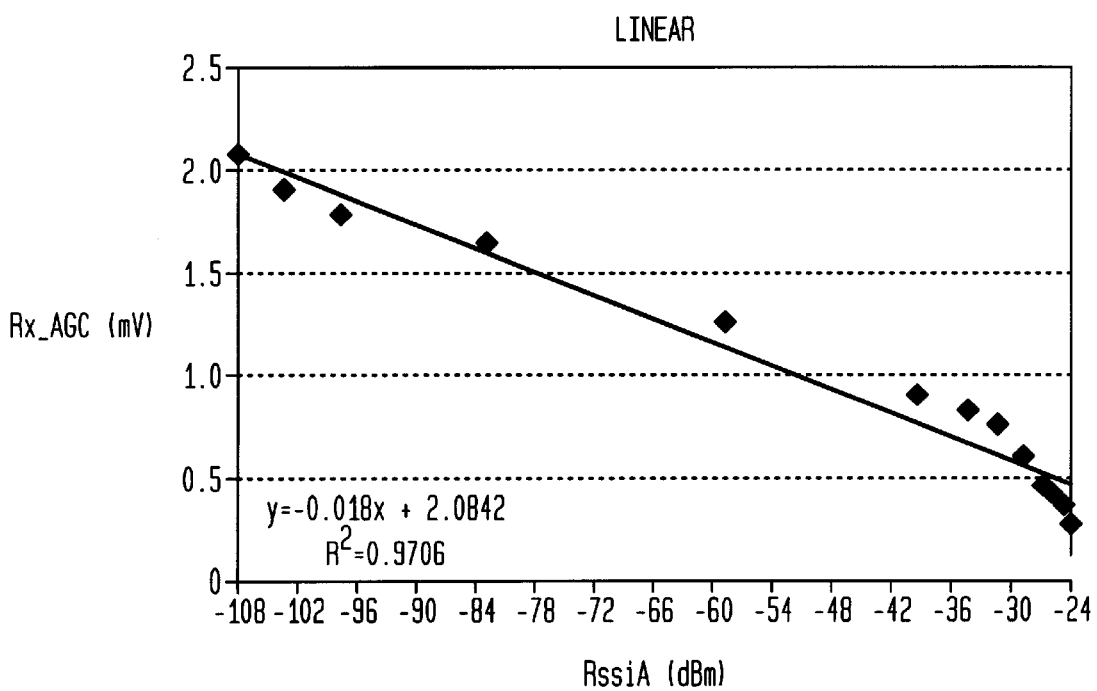
FIGS. 3a–3d are graphs of various functions with coefficients calibrated according to the present invention in comparison to the data point look-up table of FIG. 1.

A particular example of selecting the proper equation form can be demonstrated with respect to FIGS. 3a–3d, which illustrate curve fitting for a set of sample RssiA/Rx_AGC data points. FIG. 3a illustrates a first-order polynomial approximation y=Ax+B of the test data points, where x=RssiA and y=Rx_AGC. As shown, the value for $R^2$ is 0.9706, which is not sufficient for an accurate fit. A visual inspection also indicates that most of the data points lie off of the line.

Figure 3B:
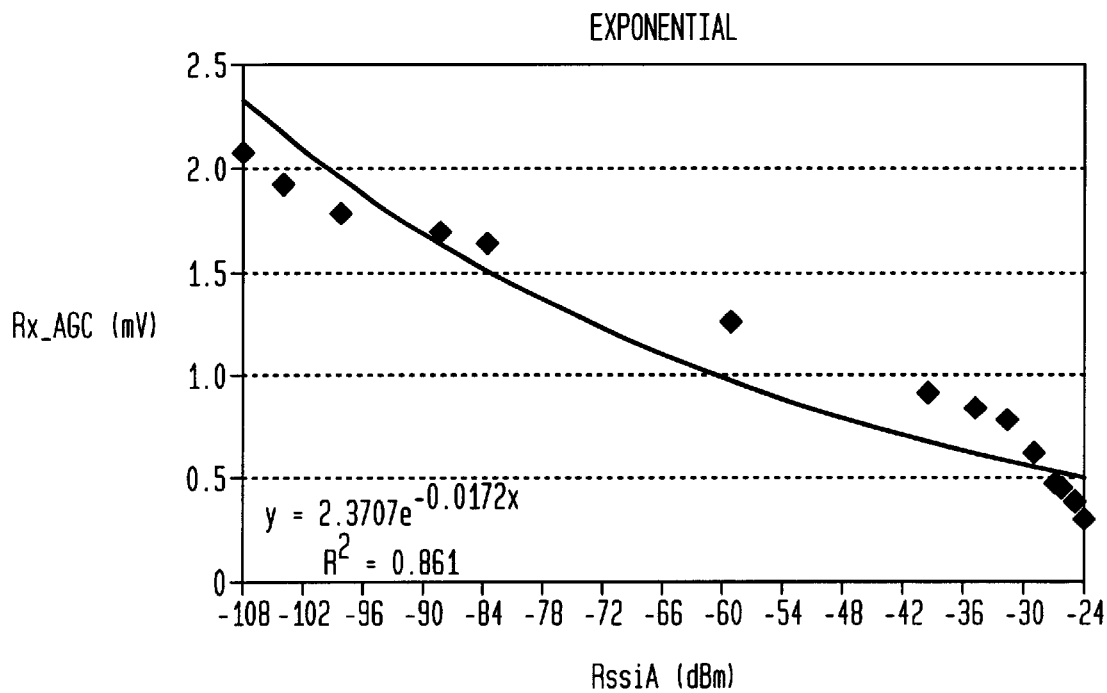
Figure 3C:
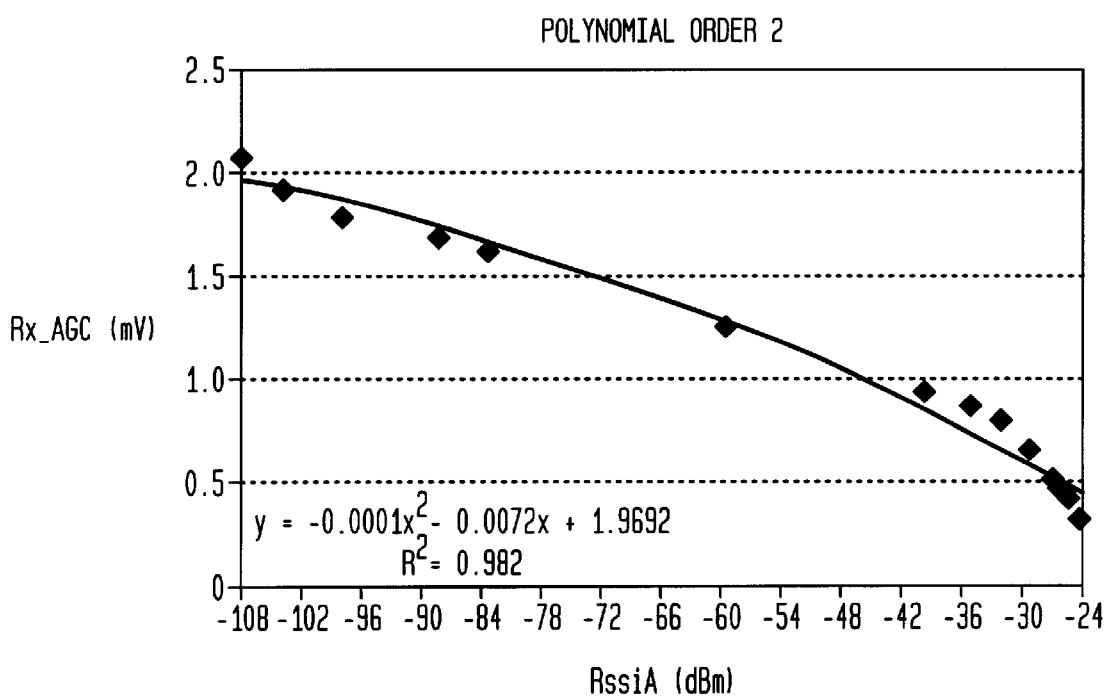

FIG. 3b illustrates an attempt to fit an exponential curve, $y=Ae^{BX}$, to the data points. This curve does not accurately represent the data points, as indicated by the value of $R^2=0.861$. It should be noted, however, that an exponential curve may be the best type of curve to match other parameters, particularly in view of the fact that various electrical components, such as diodes, have exponential transfer functions. FIG. 3c is a second order curve of the form $y=Ax^2+Bx+C$. As illustrated, the residue $R^2=0.982$ is fairly close.

Figure 3D:
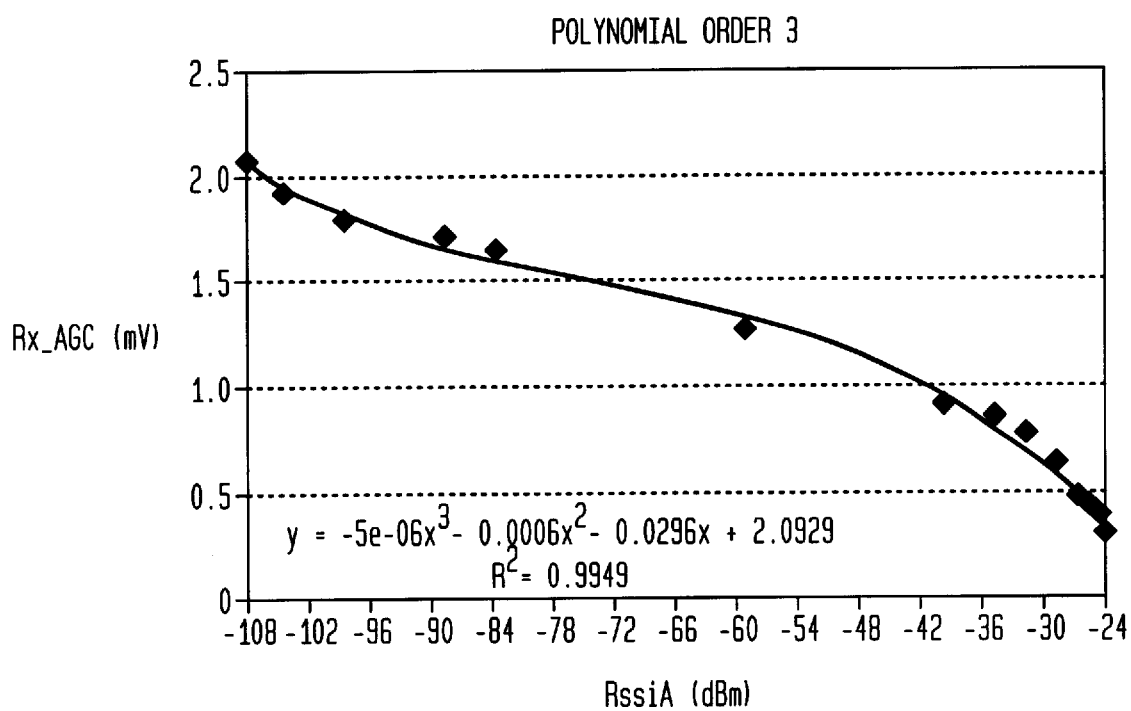

FIG. 3d illustrates a plot of a third order polynomial $y=Ax^3+Bx^2+Cx+D$. As indicated by the residue $R^2=0.9949$, the resulting curve closely follows the representative set of data points. Accordingly, a third order polynomial is sufficient to represent this particular parameter and, during a calibration process, the four best coefficients for a particular set of data points will be generated. If the sample data points illustrated in FIG. 3d were gathered during an actual calibration process, the coefficients A=–5E–06, B=0.0006, C=–0.0292, and D=2.0929 would be stored in the memory 24 of the device. It is understood that while only a limited number of data points are illustrated in the Figures, in practice, a very large number of data points can be gathered and used during the curve fitting process.

Figure 4:
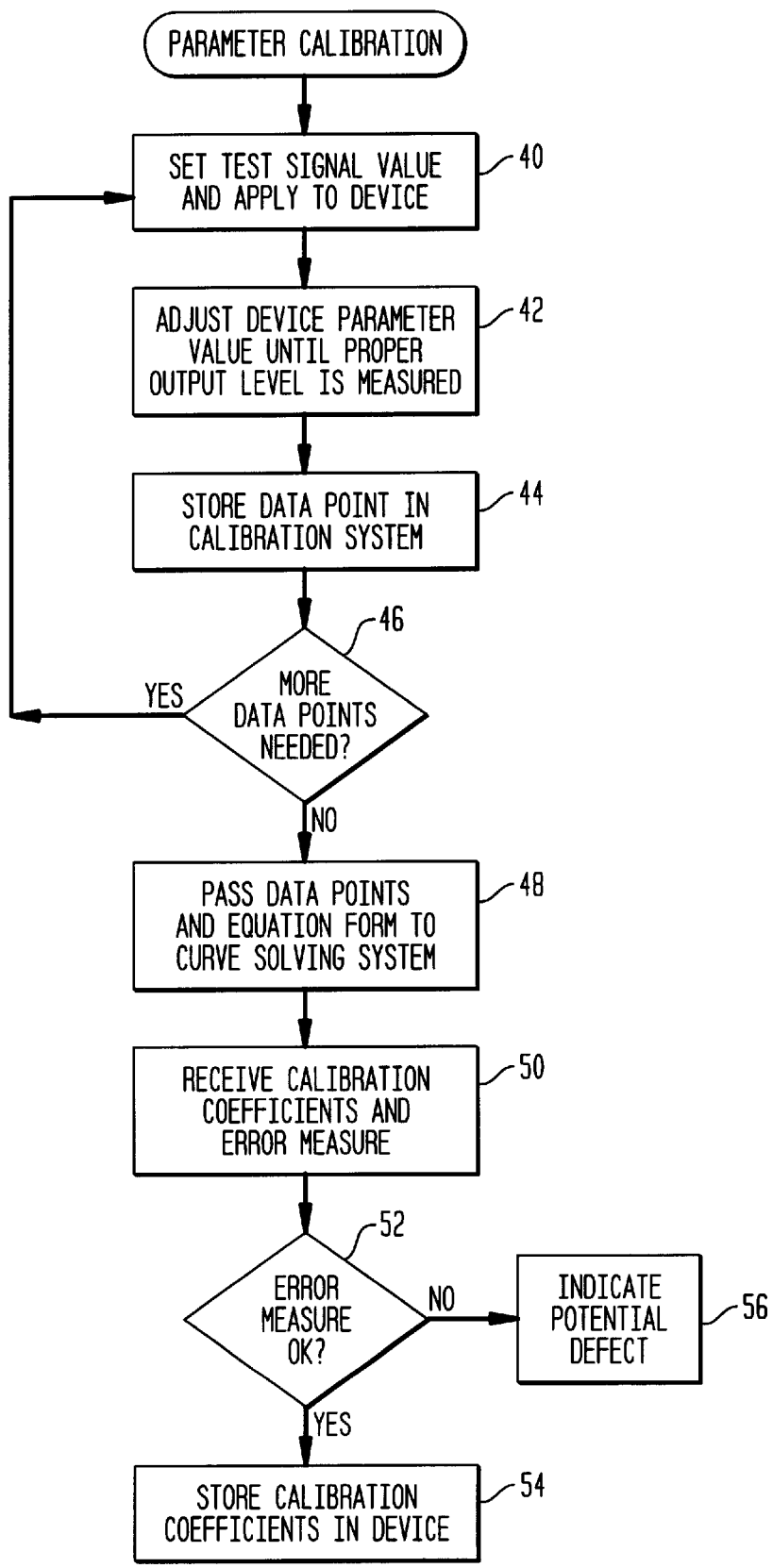
FIG. 4 is a flowchart of the operation of the system of FIG. 2 used to calibrate an electronic device.

The calibration method for a single parameter according to the invention is summarized in the flowchart of FIG. 4. First, the value of the test signal is set to a selected value and applied to the device being calibrated (step 40). The calibration parameter is then adjusted until the device output complies with the design requirements for the particular value (step 42). Once the correct output for the applied test signal value is measured, the values of the test signal and the corresponding parameter are stored as a data point (step 44). The process repeats using different test signal values until the desired number of data points have been stored (step 46).

Once a set of calibration data points is stored, the set and the predetermined form for the calibration equation is passed to the curve solving system (step 48). The data points are then analyzed and the coefficients for a curve of the predefined form that best matches the data point set is returned. Also, preferably an error measure is returned which indicates how closely the calibration curve, i.e., an instantiation of the calibration equation with the determined coefficients, matches the data points (step 50). The error measure is then checked to ensure that it is within normal limits (step 52). If the error measure is acceptable, the coefficients are stored in the appropriate locations in a memory within the device being calibrated (step 54). If the error measure is unacceptable, a potential defect in the device is indicated (step 56). This method is repeated for other parameters or the same parameters under different internal operating conditions, such as different receiving and transmitting frequencies, as required. It is understood that when several parameters are to be calibrated, analysis of the coefficients and error measures may be deferred until all parameters have been processed. Preferably, storing of the calibration coefficients in the device is done as part of a single store operation after the coefficients for each of the parameters to be calibrated have been generated.

Thus, calibrating a device according to the present invention allows the relatively large number of stored data points used with conventional techniques to be replaced with a limited number of points. The amount of data which must be stored is further reduced because only the equation coefficients—which are discrete digits—need to be stored. In contrast, storing selected data points themselves requires storing both the input and corresponding output components in memory or restricting the position of data points along the performance curve to fixed locations. The saving in storage with the present invention allows calibration information for a larger number of parameters to be stored in a given sized memory or the device's internal memory size can be reduced and less expensive components utilized.

In a variant of the invention, a single parameter curve can be divided into two or more segments, each of which is separately calibrated. Because the segments are smaller, the applied calibration equation is generally more accurate. Alternatively, smaller curve segments may be suitable for representation using simpler equations, which both require fewer coefficients and which can be more quickly applied when the device is operated.

While the invention has been particularly shown and described with reference to preferred embodiments thereof, it will be understood by those skilled in the art that various changes in form and details may be made therein without departing from the spirit and scope of the invention.

I claim:

1. A method for calibrating the magnitude of a parameter used to adjust an output characteristic of an electronic device in accordance with the magnitude of an input signal, said method comprising the steps of:

generating a plurality of test data points each comprising a particular input signal magnitude and a corresponding particular parameter calibration value, the output characteristic of said device when said parameter is set to said particular calibration value being the appropriate characteristic for an input signal of said particular magnitude;

determining the value for coefficients of an equation of predetermined form such that said equation with said coefficients defines a curve that substantially follows a plot of said plurality of test data points; and storing said coefficients in said electronic device, wherein a calibrated parameter value is provided when said electronic device evaluates said equation with said stored coefficients using the detected magnitude of said input signal.

2. The method of claim 1, wherein said step of generating a plurality of test data points comprises the steps of:

(a) applying a test input signal having a predetermined magnitude to said device;

(b) measuring said output characteristic as generated by said device in response to said test signal;

(c) adjusting the value of said parameter controlling said output characteristic until the measured output characteristic complies with a predetermined output characteristic;

(d) storing the predetermined magnitude of said applied test input signal and said parameter value as a test data point; and (e) repeating steps (a)–(d) with an applied test input signal having a different predetermined magnitude.

3. The method of claim 1, wherein said step of determining comprises the steps of:

passing said plurality of test data points to a curve solving system; and receiving said coefficients in response from said curve solving system.

4. The method of claim 3, wherein said curve solving system provides an error measure indicating how closely said equation with said coefficients follows a plot of said plurality of test data points.

5. The method of claim 4, further comprising the steps of:

comparing said error measure with a predetermined error limit; and indicating a potential defect in said electronic device when said error measure exceeds said predetermined limit.

6. A method of calibrating the power output for a mobile cellular unit to the strength of a signal received from a base station, the power output of said unit being determined by the value of a signal applied to an output amplifier, said method comprising the steps of:

generating a plurality of test data points each comprising a particular received signal strength value and a corresponding signal parameter value, the correct output power for said particular received signal strength value being provided by said unit when a signal having said corresponding signal parameter value is applied to said output amplifier;

determining the value for coefficients of an equation of predetermined form such that said equation with said coefficients defines a curve that substantially follows a plot of said plurality of test data points; and storing said coefficients in said electronic device, wherein a calibrated signal parameter value is provided when said unit evaluates said equation with said stored coefficients using a detected received signal strength value.

7. The method of claim 6, wherein said step of generating a plurality of test data points comprises the steps of:

(a) applying a test base station signal having a predetermined power level to said unit;

(b) measuring the output power as generated by said device in response to said test base station signal;

(c) adjusting the value of said signal parameter until the measured output power substantially equals a predetermined output power level appropriate for a unit receiving a base station signal having a power level equal to said predetermined power level;

(d) storing the predetermined power level and said signal parameter value as a test data point; and (e) repeating steps (a)–(d) using a different predetermined power level.

8. A system for calibrating the magnitude of a parameter used to adjust an output characteristic of an electronic device in accordance with the magnitude of an input signal, comprising:

a signal generator for producing a test input signal of predetermined magnitude;

a signal detector for detecting the magnitude of said output characteristic;

a calibration control system providing said predetermined magnitude for test input signal to said signal generator and receiving said detected magnitude of said output characteristic from said signal detector and comprising:

at least one control input for adjusting the magnitude of said parameter in said device until the detected magnitude of said output characteristic substantially equals a calibration magnitude appropriate for the predetermined magnitude of said test input signal; and a memory for storing a plurality of test data points each comprising the predetermined magnitude of said test input signal and the magnitude of said parameter in said device when the detected magnitude of said output characteristic substantially equals said calibration magnitude;

a curve solving system for receiving said plurality of test data points and providing coefficients of an equation of predetermined form, said equation with said coefficients defining a curve that substantially follows a plot of said plurality of test data points;

said calibration control system further comprising a data connection for writing said coefficients into a memory in said electronic device.

9. A system for calibrating the magnitude of a parameter used to adjust an output characteristic of an electronic device in accordance with the magnitude of an input signal, said system comprising:

means for generating a plurality of test data points each comprising a particular input signal magnitude and a corresponding particular parameter calibration value, the output characteristic of said device when said parameter is set to said particular calibration value being the appropriate characteristic for an input signal of said particular magnitude;

means for determining the value for coefficients of an equation of predetermined form such that said equation with said coefficients defines a curve that substantially follows a plot of said plurality of test data points; and means for storing said coefficients in said electronic device, wherein a calibrated parameter value is provided when said electronic device evaluates said equation with said stored coefficients using the detected magnitude of said input signal.

* * * * *